US008638452B2

(12) United States Patent
Muhle et al.

(10) Patent No.: US 8,638,452 B2
(45) Date of Patent: Jan. 28, 2014

(54) MEASURING HEAD FOR A CHASSIS MEASURING SYSTEM, CHASSIS MEASURING SYSTEM AND METHOD FOR DETERMINING THE POSITION PARAMETERS OF MEASURING HEADS OF A CHASSIS MEASURING SYSTEM

(75) Inventors: Daniel Muhle, Herford (DE); Anke Svensson, Braunschweig (DE); Matthias Roland, Hannover (DE); Axel Wendt, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 12/736,004

(22) PCT Filed: Feb. 2, 2009

(86) PCT No.: PCT/EP2009/051110
§ 371 (c)(1),
(2), (4) Date: Dec. 9, 2010

(87) PCT Pub. No.: WO2009/118211
PCT Pub. Date: Oct. 1, 2009

(65) Prior Publication Data
US 2011/0085181 A1   Apr. 14, 2011

(30) Foreign Application Priority Data
Mar. 26, 2008 (DE) .......................... 10 2008 000 833

(51) Int. Cl.
*G01B 11/14* (2006.01)
(52) U.S. Cl.
USPC ..................... 356/615; 356/155; 356/139.09

(58) Field of Classification Search
USPC ............... 356/614–623, 155, 139.09; 33/203, 33/288, 286
See application file for complete search history.

(56) References Cited

U.S. PATENT DOCUMENTS

| 4,130,362 A | 12/1978 | Lill et al. |
| 4,639,878 A | 1/1987 | Day et al. |
| 5,812,256 A * | 9/1998 | Chapin et al. ............ 356/139.09 |
| 5,978,077 A | 11/1999 | Koerner et al. |
| 6,148,528 A * | 11/2000 | Jackson ......................... 33/288 |
| 6,690,456 B2 * | 2/2004 | Bux et al. ................. 356/139.09 |

(Continued)

FOREIGN PATENT DOCUMENTS

| CN | 1516806 | 7/2004 |
| DE | 36 18 480 | 12/1986 |
| FR | 2 808 082 | 10/2001 |

*Primary Examiner* — Hoa Pham
(74) *Attorney, Agent, or Firm* — Kenyon & Kenyon LLP

(57) ABSTRACT

A chassis measuring system comprises an illumination device for producing a structured illumination (38, 58, 78, 98), which is developed in such a way that it produces a structured image on a measuring head (32, 52; 72, 92) situated opposite in the transverse vehicle direction, a reference surface (40, 60, 80, 100) facing in the same direction as the illumination device (38, 58, 78, 98), on which a structured image produced by an illumination device (38, 58; 78, 98) of the measuring head (32, 52; 72, 92) situated opposite in the transverse vehicle direction may be projected, and at least one measuring camera (34, 36; 54, 56; 74, 76; 94, 96) facing in the same direction as the illumination device (38, 58, 78, 98), which is developed in such a way that it detects the structured image on the reference surface (40, 60; 80, 100) of the opposite measuring head (32, 52; 72, 92) in order to determine the position parameters of the measuring head (32, 52, 72, 92).

19 Claims, 6 Drawing Sheets

(56) References Cited

U.S. PATENT DOCUMENTS

| | | |
|---|---|---|
| 2002/0189115 A1* | 12/2002 | Jackson et al. ................. 33/286 |
| 2004/0039544 A1 | 2/2004 | Merrill et al. |
| 2005/0005463 A1* | 1/2005 | O'Mahony et al. ............. 33/286 |
| 2007/0124949 A1* | 6/2007 | Burns et al. ..................... 33/288 |
| 2009/0216484 A1* | 8/2009 | Schommer et al. ........... 702/150 |
| 2010/0318307 A1* | 12/2010 | Schommer et al. ............. 702/94 |
| 2011/0187851 A1* | 8/2011 | Nobis et al. ................... 348/135 |
| 2011/0271749 A1* | 11/2011 | Tentrup et al. ............. 73/117.02 |

* cited by examiner

MEASURING HEAD FOR A CHASSIS MEASURING SYSTEM, CHASSIS MEASURING SYSTEM AND METHOD FOR DETERMINING THE POSITION PARAMETERS OF MEASURING HEADS OF A CHASSIS MEASURING SYSTEM

BACKGROUND OF THE INVENTION

1. Field of the Invention

The present invention relates to a measuring head for a chassis measuring system, a chassis measuring system having at least one pair of measuring heads situated opposite each other in the transverse vehicle direction and a method for determining the position parameters of measuring heads of a chassis measuring system.

2. Description of Related Art

In optical contactless chassis measurement, e.g. when measuring the track and camber in motor vehicles, measuring heads having measuring cameras are used, which respectively detect one wheel of the motor vehicle or a target attached to it. The position of wheel axles, axes of rotation, wheel centers or centers of rotation may be calculated from the measuring values, and the values of track and camber may be determined on this basis.

A basic prerequisite of a contactless chassis measuring system is that the geometric position parameters of the measuring heads relative to each other, in particular their distance and orientation, are known, and that the measuring values of all measuring heads are present in a common coordinate system or reference system or are transformed into such a common coordinate system. It is known from published German patent document DE 3618480 that the measuring heads measure points on a ground control point element. From the measurement of the ground control points in the local reference system of the individual measuring heads and the known coordinates of the ground control points it is possible to transform the local coordinate system of each measuring head into the common global coordinate system. This method requires the presence of a ground control point element, which entails additional effort and additional costs.

SUMMARY OF THE INVENTION

It is therefore the objective of the present invention to provide a measuring head for a chassis measuring system, a chassis measuring system and a method for determining the position parameters of measuring heads of a chassis measuring system, in which the position parameters of the measuring heads may be determined simply, quickly and cost-effectively.

These and other objects of the invention are achieved by a measuring head for a chassis measuring system, comprising an illumination device for producing a structured illumination (38, 58, 78, 98), which is developed in such a way that it produces a structured image on a measuring head (32, 52; 72, 92) situated opposite in the transverse vehicle direction, a reference surface (40, 60, 80, 100) facing in the same direction as the illumination device (38, 58, 78, 98), on which a structured image produced by an illumination device (38, 58; 78, 98) of the measuring head (32, 52; 72, 92) situated opposite in the transverse vehicle direction may be projected, and at least one measuring camera (34, 36; 54, 56; 74, 76; 94, 96) facing in the same direction as the illumination device (38, 58, 78, 98), which is developed in such a way that it detects the structured image on the reference surface (40, 60; 80, 100) of the opposite measuring head (32, 52; 72, 92) in order to determine the position parameters of the measuring head (32, 52, 72, 92).

According to the present invention, the term chassis measurement is understood as a generic term for axle measurement and for other applications such as dynamic shock absorber testing for example. According to the present invention, the term measuring cameras includes all optical detecting devices that are used in contactless chassis measurement, in particular video cameras and video sensors.

According to a basic idea of the present invention, the geometric position parameters of the measuring heads may be determined in a simple manner and the measuring data received from the measuring heads may thus be represented in a common coordinate system without requiring additional markings on the measuring station or on the measuring head or even ground control point elements. The costs for such additional markings or ground control point elements, which are required in methods according to the related art, may be saved according to the present invention. The determination of the position parameters of the measuring heads according to the present invention allows for the geometric position parameters to be checked and restored, if necessary, at any time and in a simple manner. If a deviation is ascertained in the positioning of the measuring heads, in particular in their distance and orientation, from the premised setpoint values, then on the one hand measuring heads may be suitably shifted or rotated such that an agreement is achieved between the actual position parameters and the predefined position parameters, and on the other hand the changed position parameters may be included in calculating the transformation of the local coordinate systems into the global coordinate system such that the adjustment of the position parameters and the restoration of the common global coordinate system are done purely computationally.

A measuring head of the present invention for a chassis measuring system comprises an illumination device for generating a structured illumination on a measuring head situated opposite in the transverse vehicle direction. This illumination device is designed in such a way that it produces both on the object to be measured as well as on the opposite measuring head a structured image having a known pattern, the spatial extent of which satisfies the requirements of the desired measuring accuracy. The measuring head according to the present invention further comprises a reference surface facing the same direction as the illumination device, which is situated on the measuring head in such a way that the structured image of the illumination device of the opposite measuring head may be imaged on it. The measuring head according to the present invention furthermore includes at least one measuring camera facing the same direction as illumination device for detecting the structured image on the reference surface of the opposite measuring head and for determining the position parameters of the measuring head from it. The mutual positional relationship between the illumination device, the reference surface and the at least one measuring camera is determined by the calibration of the measuring head.

In the method according to the present invention for determining the position parameters of measuring heads of a chassis measuring system, at least one pair of measuring heads situated opposite each other in the transverse vehicle direction is provided and for each pair of first and second measuring heads the following steps are carried out: producing a structured image on the reference surface of the second measuring head using the illumination device of the first measuring head and detecting the structured image using the measuring camera of the first measuring head; determining the position parameters of the reference surface of the second measuring head in the local coordinate system of the first measuring head by comparing the produced structured image with stored reference images; and determining the position parameters of the measuring heads with respect to each other.

On the basis of the known orientation between the illumination unit and the camera(s) it is possible to determine 3D points, lines or partial lines in the coordinate system of the first measuring head depending on the characteristic of the projected structured image on the reference surface of the second measuring head. From the information measured in the first measuring head it is possible to determine the orientation of the reference surface of the second measuring head in the coordinate system of the first measuring head. From the orientation of the reference surface in the first measuring head and the orientation known in the second measuring head between the measuring head and the reference surface, it is subsequently possible to determine the sought-after orientation between the first and the second measuring head.

The method according to the present invention may be used both for determining the orientation of the measuring heads prior to the actual measurement as well as for checking and adjusting the orientation during the measurement.

When determining the orientation prior to measurement, the measuring heads, without a motor vehicle being present on the measuring station, are aligned to one another in such a way that the illuminations for the structured illumination project the structured image onto the reference surface of the respectively opposite measuring head. The use of the structured illumination in this case has a supporting effect. Because the projected structured image is directly visible on the other measuring heads and thus supports the alignment, the position parameters of the measuring heads may be determined by the method according to the present invention.

Checking and adjusting the orientation of the measuring heads during the measurement is used in particular in flexible axle measuring systems in which the measuring heads are mobile and may be moved during the measurement, for example, so as to be able to measure motor vehicles having different wheel bases. For this purpose, the method according to the present invention makes it possible to detect and possibly adjust the movement or shift of the measuring head.

If the illumination device and the reference surfaces are installed so as to allow for reciprocal monitoring below or above the vehicle, then the method according to the present invention may be used not only on an empty measuring station, but also on a measuring station having a vehicle located on it.

In a simple variant, the chassis measuring system according to the present invention and the method for determining the position parameters according to the present invention respectively include a pair of measuring heads situated opposite each other in the transverse vehicle direction.

In a design having four measuring heads, which are respectively situated opposite from a wheel of a motor vehicle, it is also possible to determine the position parameters for at least one pair of measuring heads situated across from each other in the longitudinal vehicle direction by producing a structured image and detecting the same using a measuring camera and by comparing the detected structured image with stored reference images. This makes it possible to establish the longitudinal connection between the two pairs of measuring heads situated across from each other in the transverse vehicle direction. If such a longitudinal connection exists on both sides of the motor vehicle, then changes in position may be detected at any time and also adjusted even when a motor vehicle is situated on the measuring station.

The present invention is explained in greater detail below on the basis of exemplary embodiments with reference to the attached figures.

DETAILED DESCRIPTION OF THE INVENTION

Figure 1:
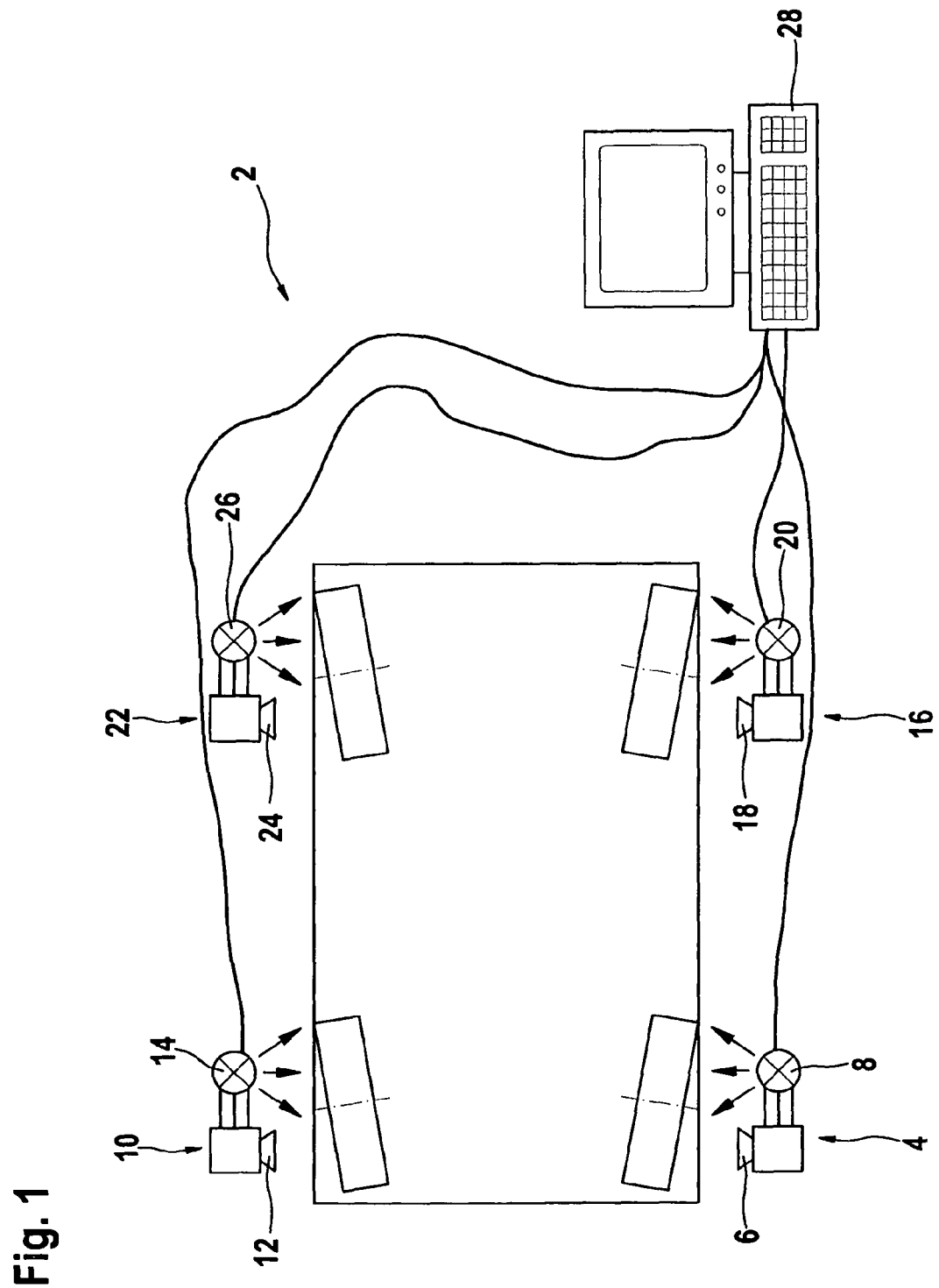
FIG. 1 shows a schematic representation of a first contactless chassis measuring system on a measuring station according to a first exemplary embodiment.

FIG. 1 shows a schematic representation of a first contactless chassis measuring system 2 on a measuring station.

Four wheels of a motor vehicle are represented schematically on the measuring station. A first measuring head 4 is situated next to the left front wheel, a second measuring head 10 is situated next to the right front wheel, a third measuring head 16 is situated next to the left rear wheel and a fourth measuring head 22 is situated next to the right rear wheel. Measuring heads 4, 10, 16 and 22 respectively have a measuring camera 6, 12, 18, 24 directed onto the directly opposite vehicle wheel and a respectively associated illumination unit 8, 14, 20 and 26, which in FIG. 1 are attached in exemplary fashion on a cantilever of measuring cameras 6, 12, 18 and 24. Illumination units 8, 14, 20 and 26 may also be integrated into the measuring head, and they produce a structured illumination in operation, which is used both for measuring the wheel rims or the measuring targets attached to the wheel rims as well as for referencing the measuring heads with respect to one another. In this context, referencing refers to the process of determining the position parameters, that is, the alignment and the distances, of measuring heads 4, 10, 16 and 22 with respect to one another. Measuring heads 4, 10, 16 and 22 furthermore have reference surfaces (not shown in FIG. 1), onto which the structured images from respectively opposite illumination units 8, 14, 20 and 26 may be projected. The referencing requires that there exists a line of sight between measuring heads 4 and 10 as well as 16 and 22 situated across from each other, that is, that there is no motor vehicle situated on the measuring station or that a motor vehicle does not block the line of sight.

In FIG. 1, measuring heads 4, 10, 16 and 22 are connected in exemplary fashion via connecting lines to a data processing unit 28. This connection may of course be implemented wirelessly as well. First chassis measuring system 2 yields the advantages that measuring heads 4, 10 as well as 16 and 22 may be referenced with respect to each other, and illumination units 8, 14, 20 and 26, which are present anyway for the measurement, may be used for this purpose, without having to provide separate marks or ground control point elements on the measuring station for this purpose. This makes it possible to save costs.

Figure 2:
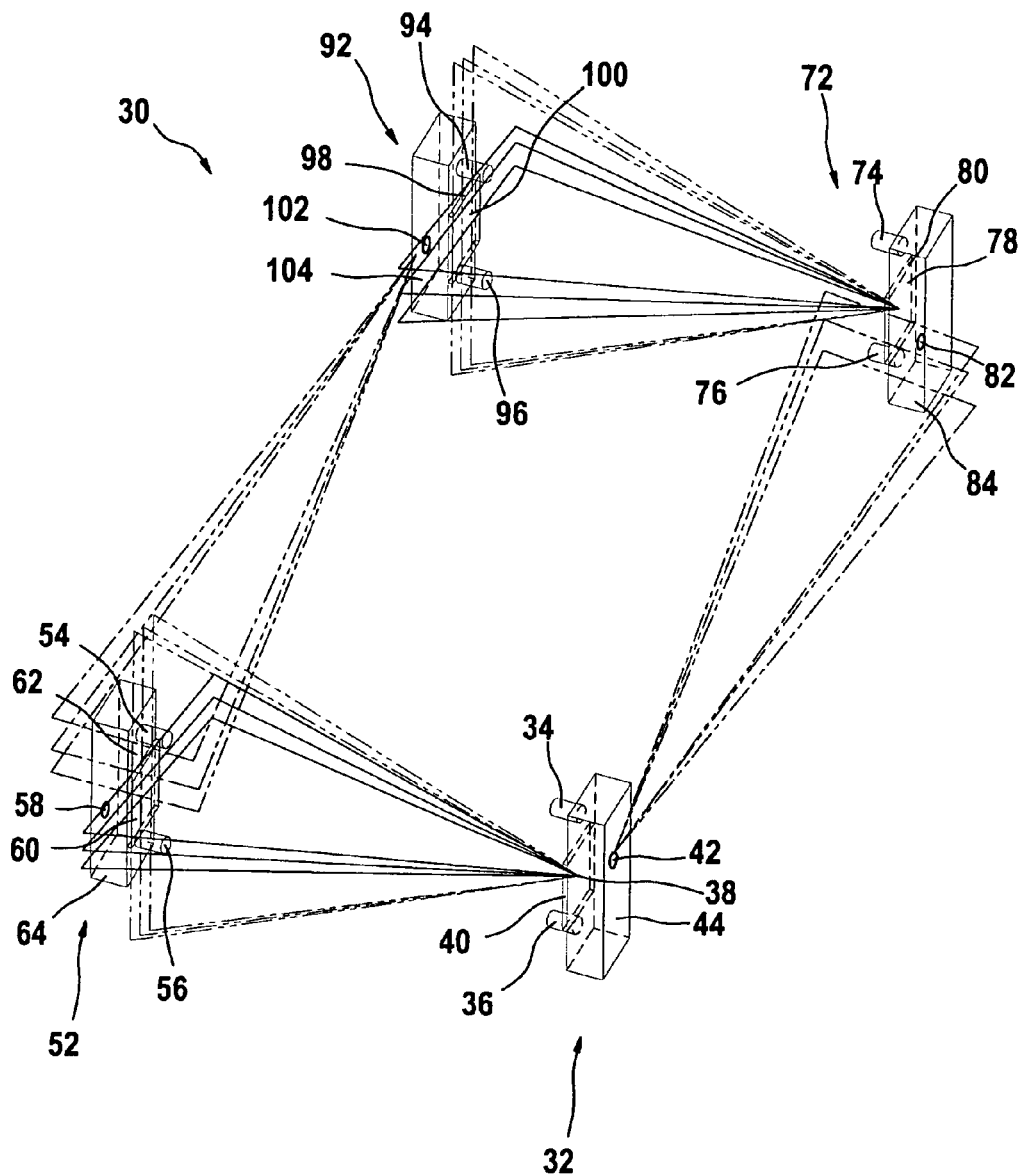
FIG. 2 shows a schematic representation of a second contactless chassis measuring system on a measuring station according to a second exemplary embodiment.

FIG. 2 shows a schematic representation of a second contactless chassis measuring system 30 on a measuring station, on which no motor vehicle is situated and to that extent an unobstructed line of sight exists between measuring heads 32 and 52 as well as 72 and 92 situated across from each other in the transverse motor vehicle direction.

Measuring heads 32, 52, 72 and 92 have a basic block shape having a vertical extension. Measuring heads 32, 52, 72 and 92 respectively comprise an upper stereo measuring camera 34, 54, 74 and 94, a lower stereo measuring camera 36, 56, 76 and 96, a transverse illumination unit 38, 58, 78 and 98 situated between the two cameras of a measuring head and represented in star-like fashion in FIG. 2, and a transverse reference surface 40, 60, 80 and 100 situated between the two cameras of a measuring head. These elements point in the same direction, namely, in the transverse vehicle direction and toward the opposite measuring head.

Front measuring heads 32 and 52 have on their backward side longitudinal illumination units 42 and 62 represented in star-like fashion and longitudinal reference surfaces 44 and 64, which are situated approximately at an intermediate height on the backside of front measuring heads 32 and 52. Furthermore, front measuring heads 32 and 52 have backward facing reference cameras (not shown in FIG. 2).

Rear measuring heads 72 and 92 have on their forward facing side at an approximately intermediate height forward facing longitudinal illumination units 82 and 102 as well as longitudinal reference surfaces 84 and 104.

FIG. 2 furthermore shows the structured illumination in the form of light planes, which are produced by the transverse illumination unit 38 of front left measuring head 32, by longitudinal illumination unit 42 of front left measuring head 32, by transverse illumination unit 78 of left rear measuring head 72 and by longitudinal illumination unit 102 of rear right measuring head 92. These structured illuminations strike the associated reference surfaces 60, 84, 100 and 64 and respectively form a structured image on those surfaces, as will be explained below with reference to FIG. 6.

Figure 3:
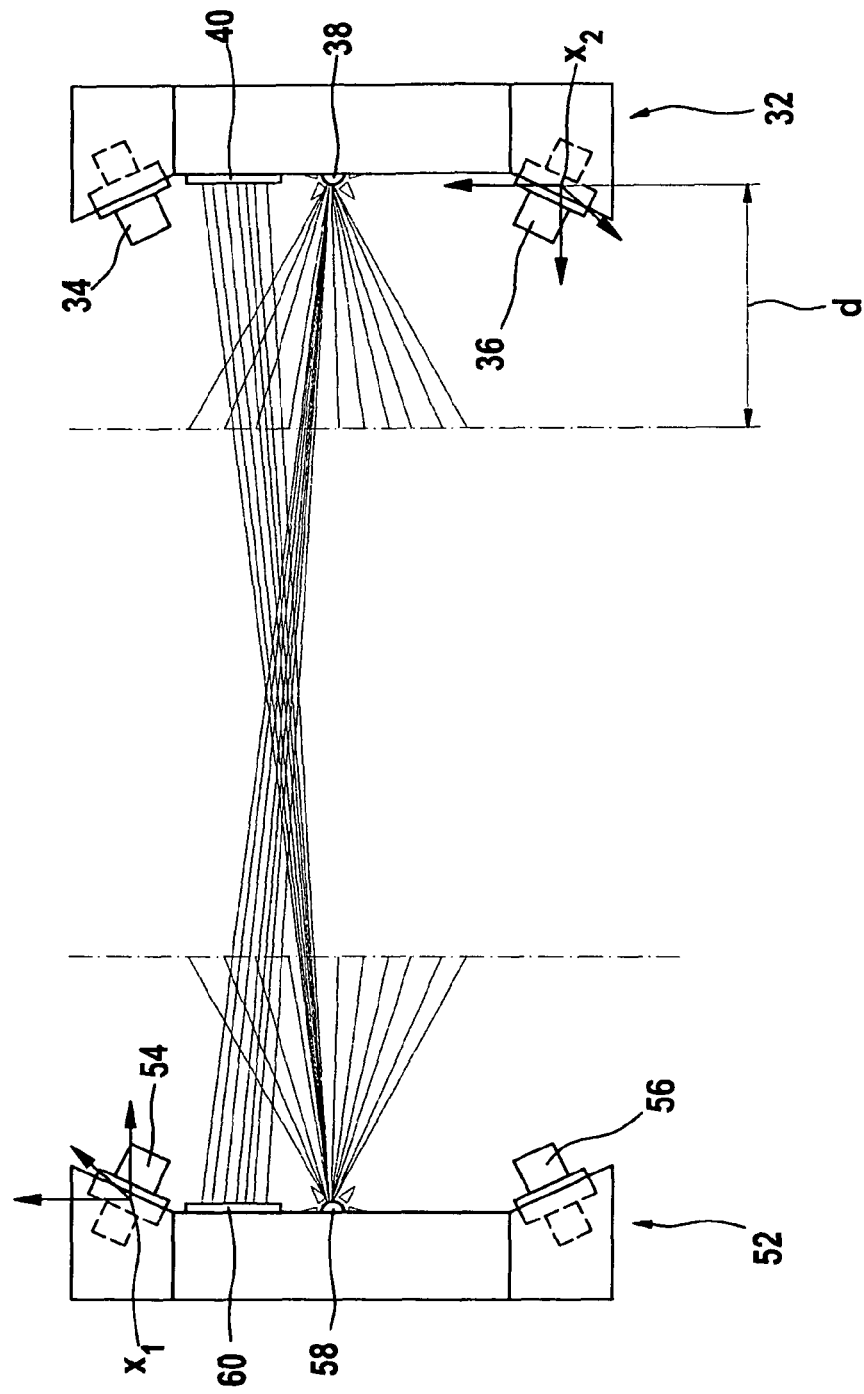
FIG. 3 shows a schematic representation of the front measuring heads of the second contactless chassis measuring system from the front.

FIG. 3 shows a schematic representation of front measuring heads 32 and 52 from the front.

Lower stereo measuring cameras 36 and 56 are shown to be tilted slightly upward and upper stereo cameras 34 and 54 are shown to be tilted slightly downward. Transverse illumination units 38 and 58 are represented in star-like fashion, developed as laser illumination units and situated approximately at the center between the upper and lower measuring cameras. The exemplary embodiment of FIG. 3 shows transverse reference surfaces 40 and 60 separately, situated between transverse illumination units 38, 58 and upper stereo cameras 34 and 54 and vertically oriented. The letter d represents the usual distance between front left measuring head 32 and the wheel/wheel rim, or the target attached thereon, of the motor vehicle to be measured. With the aid of the structured illumination represented by lines, which is radiated respectively by transverse illumination units 38 and 58, it is thus possible both to illuminate the wheel rim to be measured, or the target to be measured that is attached to the wheel rim, as well as to represent a structured image on transverse reference surface 40, 60 of the respectively opposite measuring head 32 and 52.

Furthermore, in FIG. 3, $X_1$ indicates the local coordinate system of front right measuring head 52 and $X_2$ indicates the local coordinate system of front left measuring head 32.

Figure 4:
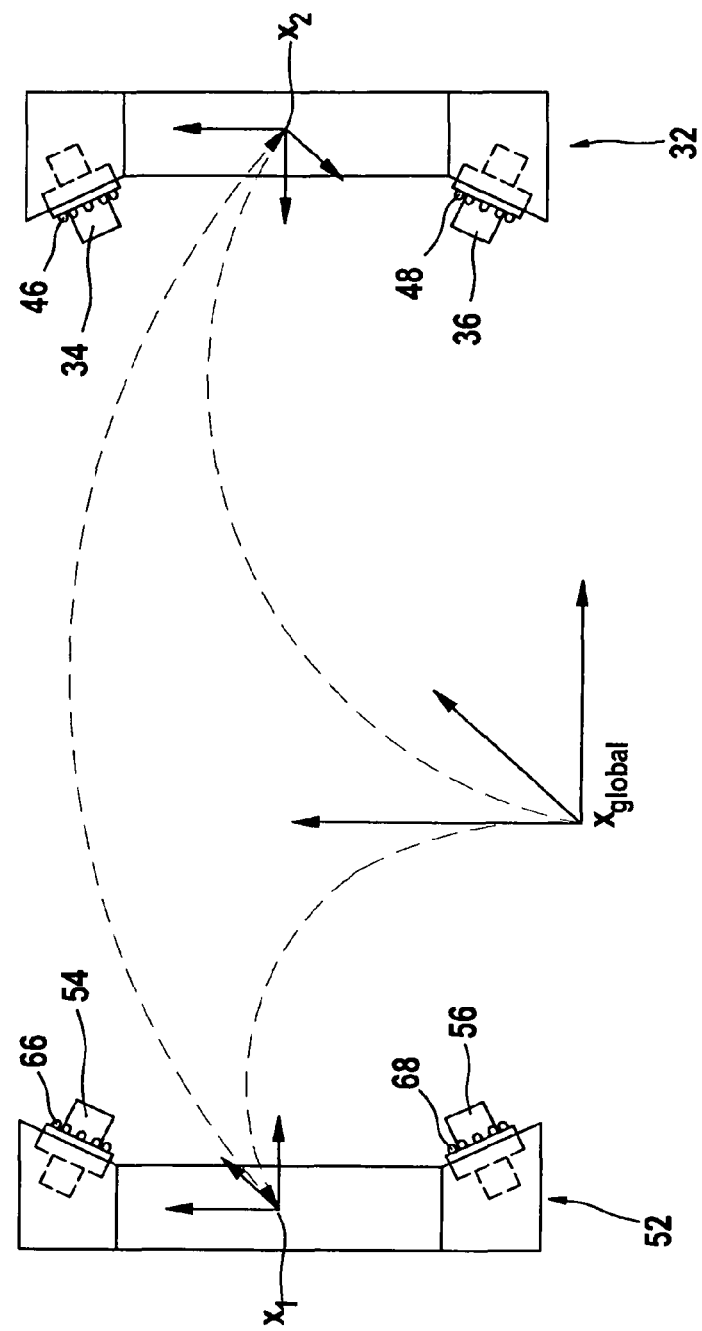
FIG. 4 shows a schematic representation of the front measuring heads of the second contactless chassis measuring system from the front and of the associated coordinate systems.

FIG. 4 shows a schematic representation of front measuring heads 32 and 52 and the associated coordinate systems.

In FIG. 4, upper stereo measuring cameras 34, 54 are equipped with measuring LEDs arranged in ring-like fashion and lower stereo cameras 36, 56 are equipped with lower measuring LEDs 48, 68 arranged in ring-like fashion. These measuring LEDs 46, 66; 48, 68 may be provided additionally or in place of transverse illumination units 38 and 58. Transverse reference surfaces 40 and 60 are not shown separately in FIG. 4. In the front measuring heads 32 and 52 as shown in FIG. 4, the transverse reference surfaces are formed by the vertical surfaces between upper stereo measuring cameras 34, 54 and lower stereo cameras 36, 56.

Furthermore, local coordinate system $X_1$ of front right measuring head 52, local coordinate system $X_2$ of front left measuring head 32 and global coordinate system $X_{global}$ are shown. Using the referencing according to the present invention, local coordinate systems $X_1$ and $X_2$ are transformed into global coordinate system $X_{global}$.

Figure 5:
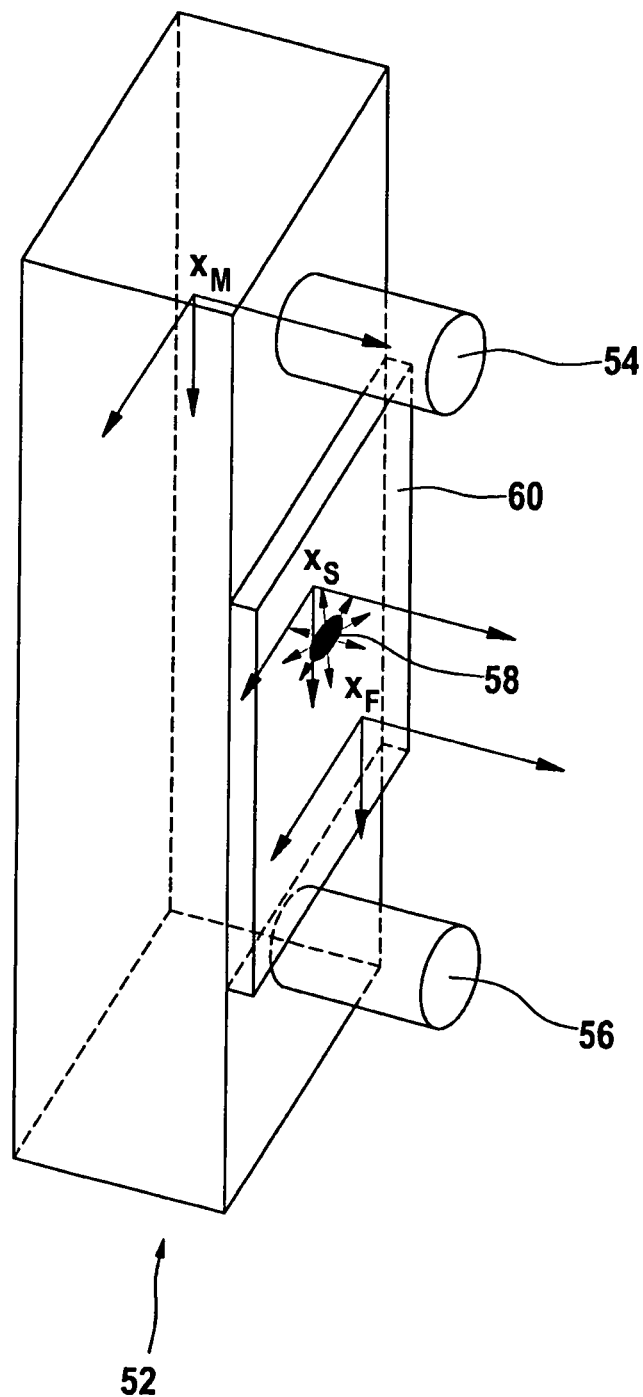
FIG. 5 shows a schematic representation of the front right measuring head of the second contactless chassis measuring system.

FIG. 5 shows a schematic representation of front right measuring head 52.

In this development of front right measuring head 52, transverse reference surface 60 is situated below transverse illumination unit 58. Furthermore, local coordinate systems $X_F$ of transverse reference surface 60, $X_S$ of the transverse illumination unit for producing structured illumination 58, and $X_M$ of front right measuring head 52 are shown as well. Transverse reference surface 60 is calibrated relative to measuring head 52.

These reference systems of front measuring head 52 are required for referencing the same.

Prior to putting measuring head 52 in operation, the orientation of transverse illumination unit 58, of transverse reference surface 60 and of measuring head 52 must be determined in a calibration process using methods known per se. The calibration determines the relative orientations between the different local coordinate systems $X_F$, $X_S$ and $X_M$. Following the calibration, one obtains the orientation $X_{M\_F}$ between local coordinate system $X_F$ of transverse reference surface 60 and coordinate system $X_M$ of measuring head 52 and the orientation $X_{M\_S}$ between the local coordinate system $X_S$ of transverse illumination unit for structured illumination 58 and the coordinate system $X_M$ of measuring head 52. These orientations are stored and are regarded as constant for the subsequent measurements.

Figure 6C:
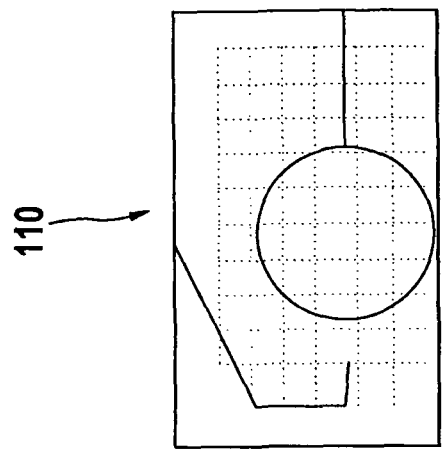
FIG. 6 shows three exemplary structured images in its partial figures (a), (b) and (c), which are produced by illumination units of the second contactless chassis measuring system on respectively opposite reference surfaces.
Figure 6B:
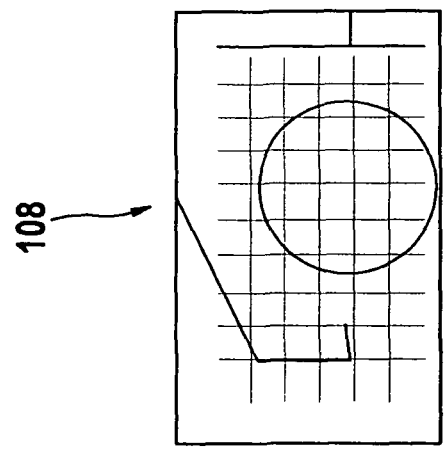
Figure 6A:
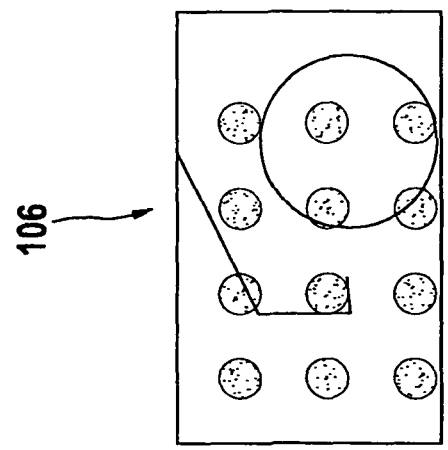

In its partial Figures (a), (b) and (c), FIG. 6 shows three exemplary structured images 106, 108 and 110, as they are produced by illumination units 38, 58, 68, 98, 42, 62, 82, 102 on opposite reference surfaces 40, 60, 80, 100; 44, 64, 84, 104 and detected by respectively associated cameras 34, 54, 74, 94, 36, 56, 76, 96 as well as by longitudinal reference cameras (not shown).

In structured images 106, 108 and 110, the field of view of the respectively opposite camera is indicated by a circle. Structured image 106 shows a matrix-dot arrangement, structured image 108 shows a gridline arrangement and structured image 110 shows a grid-partial line arrangement.

The manner of functioning of the chassis measuring system according to the present invention and of the method according to the present invention for determining the position parameters of measuring heads of a chassis measuring system is described below in exemplary fashion with reference to FIGS. 2 and 3.

In a simple specific embodiment it suffices for the chassis measuring system to comprise a pair of measuring heads 32 and 52 situated across from each other in the transverse vehicle direction. Transverse illumination unit 38 produces a structured illumination and accordingly produces a structured image on opposite transverse reference surface, as shown in FIGS. 2 and 3. This structured image is detected by at least one of the two cameras 34 and 36 of first measuring head 32. On the basis of the calibrated and thus known orientation $X_{m\_s}$ between transverse illumination unit 38 and camera 34 or 36 or cameras 34 and 36, it is possible to determine 3D dots, 3D lines or partial lines in the coordinate system of measuring head 32 depending on the development of the projected pattern on transverse reference surface 60 of second measuring head 52. From the information measured in measuring head 32 it is then possible to determine the orientation $X_{FA}$ of transverse reference surface 60 of front right measuring head 52 in the coordinate system of front left measuring head 32. From orientation $X_{FA}$ and the orientation calibrated in front right measuring head 52 between the measuring head and the reference surface it is subsequently possible to determine the sought-after orientation $X_{AB}$ between measuring heads 32 and 52. The minimum requirement for determining the reciprocal orientation is that the described method is carried out by a measuring head as was described above for front left measuring head 32.

Since the opposite measuring head 52 comprises the same system components it is possible to increase the precision or verify the result by measurement using opposite measuring head 52. For the two front measuring heads 32 and 52 this means that measurements may also be performed by front right measuring head 52.

If the position parameters between four measuring heads are to be determined, another camera and another illumination unit must be integrated in at least two measuring heads such that observations in the longitudinal vehicle direction are also possible. This is shown in exemplary fashion in the second chassis measuring system 30. It comprises respectively one longitudinal reference camera and one longitudinal illumination unit 42 and 102 (not shown in FIG. 2) in front left measuring head 32 and in rear right measuring head 92 and respectively one longitudinal reference surface 84 and 64 in the respectively opposite measuring head, that is, in the rear left measuring head 72 and front right measuring head 52. The mutual orientation and the position parameters between front left measuring head 32 and rear left measuring head 72 and between rear right measuring head 72 and front right measuring head 52 may then be determined in analogy to the method described above. In an alternative specific embodiment, the longitudinal connection may also be checked differently.

If the additional components are integrated in each measuring head, then the precision may be increased and the results verified based on the additional reciprocal observations.

What is claimed is:

1. A measuring head for a chassis measuring system, comprising:
    an illumination device for producing a structured illumination to produce a structured image on a measuring head situated opposite in the transverse vehicle direction;
    a reference surface facing in a same direction as the illumination device, on which a structured image produced by an illumination device of the measuring head situated opposite in the transverse vehicle direction is projected; and
    at least one measuring camera facing in the same direction as the illumination device to detect the structured image on a reference surface of the opposite measuring head in order to determine the position parameters of the measuring head;
    wherein a line of sight exists between the measuring head and the measuring head situated opposite in a transverse vehicle direction.

2. The measuring head as recited in claim 1, wherein two measuring cameras are provided that face in the same direction.

3. The measuring head as recited in claim 2, wherein the reference surface is situated between the two measuring cameras.

4. The measuring head as recited in claim 3, wherein the illumination device is situated between the two measuring cameras.

5. The measuring head as recited in claim 3, wherein the illumination device is attached to the measuring head.

6. The measuring head as recited in claim 3, further comprising an additional reference surface facing in the longitudinal vehicle direction, on which a structured image produced by an illumination device of a measuring head situated opposite in the longitudinal vehicle direction is able to be projected.

7. The measuring head as recited in claim 6, further comprising an additional illumination device facing in the longitudinal vehicle direction for producing a structured illumination to produce a structured image on a measuring head situated opposite in the longitudinal vehicle direction, and at least one measuring camera facing in the same direction as the illumination device to detect the structured image on the reference surface of the measuring head situated opposite in the longitudinal vehicle direction in order to determine the position parameters of the measuring head.

8. The measuring head as recited in claim 2, wherein the illumination device is situated between the two measuring cameras.

9. The measuring head as recited in claim 2, wherein the illumination device is attached to the measuring head.

10. The measuring head as recited in claim 2, further comprising an additional reference surface facing in the longitudinal vehicle direction, on which a structured image produced by an illumination device of a measuring head situated opposite in the longitudinal vehicle direction is able to be projected.

11. The measuring head as recited in claim 10, further comprising an additional illumination device facing in the longitudinal vehicle direction for producing a structured illumination to produce a structured image on a measuring head situated opposite in the longitudinal vehicle direction, and at least one measuring camera facing in the same direction as the illumination device to detect the structured image on the reference surface of the measuring head situated opposite in the longitudinal vehicle direction in order to determine the position parameters of the measuring head.

12. The measuring head as recited in claim 1, wherein the illumination device is attached to the measuring head.

13. The measuring head as recited in claim 1, further comprising an additional reference surface facing in the longitudinal vehicle direction, on which a structured image produced by an illumination device of a measuring head situated opposite in the longitudinal vehicle direction is able to be projected.

14. The measuring head as recited in claim 13, further comprising an additional illumination device facing in the longitudinal vehicle direction for producing a structured illumination to produce a structured image on a measuring head situated opposite in the longitudinal vehicle direction, and at least one measuring camera facing in the same direction as the illumination device to detect the structured image on the reference surface of the measuring head situated opposite in the longitudinal vehicle direction in order to determine the position parameters of the measuring head.

15. A chassis measuring system, comprising two pairs of measuring heads, as recited in claim 13, situated across from each other in the transverse vehicle direction, and a data processing unit connected to the two pairs of measuring heads, the data processing unit being developed such that for each pair of measuring heads situated across from each other in the transverse vehicle direction at least one structured image on a reference surface facing in the transverse vehicle direction is compared to stored reference images, and that additionally at least one structured image on a reference surface facing in the longitudinal vehicle direction is compared to stored reference images.

16. A chassis measuring system, comprising at least one pair of measuring heads, as recited in claim 1, situated across from each other in the transverse vehicle direction, and a data processing unit connected to the measuring heads to ascertain the position parameters of the measuring heads with respect to each other from the comparison of the structured image produced on the reference surface of a measuring head, which was produced by the illumination device of the opposite measuring head and was detected by the measuring camera of the opposite measuring head, with stored reference images.

17. A method for determining position parameters of measuring heads of a chassis measuring system as recited in claim 16, in which at least one pair of measuring heads situated across from each other in the transverse vehicle direction is provided and in which for each pair of first and second measuring heads the following steps are performed:
   producing a structured image on the reference surface of the second measuring head using the illumination device of the first measuring head;
   detecting the structured image using the measuring camera of the first measuring head;
   determining orientation and distance position parameters of the reference surface of the second measuring head in the local coordinate system of the first measuring head by comparing the produced structured image to stored reference images; and
   determining the position parameters of the measuring heads with respect to each other.

18. The method as recited in claim 17, wherein the following steps are performed for each pair of first and second measuring heads:
   producing a structured image on the reference surface of the first measuring head using the illumination device of the second measuring head;
   detecting the structured image using the measuring camera of the second measuring head;
   determining orientation and distance position parameters of the reference surface of the first measuring head in the local coordinate system of the second measuring head by comparing the produced structured image to stored reference images; and
   determining the position parameters of the measuring heads with respect to each other.

19. The method as recited in claim 17, wherein the following steps are performed for at least one pair of measuring heads situated across from each other in the longitudinal vehicle direction:
   producing a structured image on the reference surface of the measuring head situated opposite in the longitudinal vehicle direction and detecting the structured image;
   determining orientation and distance position parameters of the reference surface of the measuring head situated opposite in the longitudinal vehicle direction in the local measuring head coordinate system by comparing the produced structured image to stored reference images; and
   determining the position parameters of the measuring heads situated across from each other in the longitudinal vehicle direction with respect to each other.

* * * * *

UNITED STATES PATENT AND TRADEMARK OFFICE
CERTIFICATE OF CORRECTION

PATENT NO. : 8,638,452 B2  Page 1 of 1
APPLICATION NO. : 12/736004
DATED : January 28, 2014
INVENTOR(S) : Muhle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 459 days.

Signed and Sealed this
Twenty-second Day of September, 2015

Michelle K. Lee
*Director of the United States Patent and Trademark Office*